Sept. 27, 1949.     J. BRELL     2,483,379
MEANS FOR HANDLING RETAINING RINGS
Filed Aug. 19, 1946     3 Sheets-Sheet 1
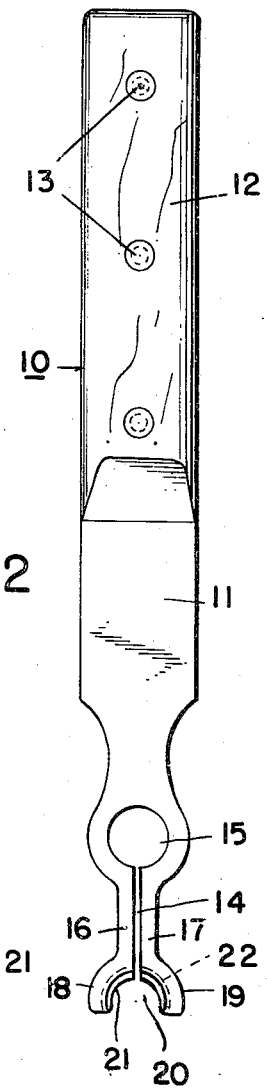
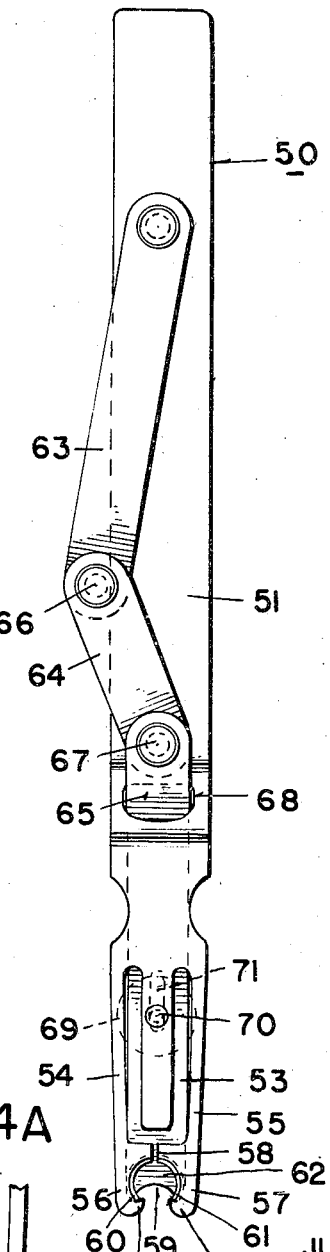
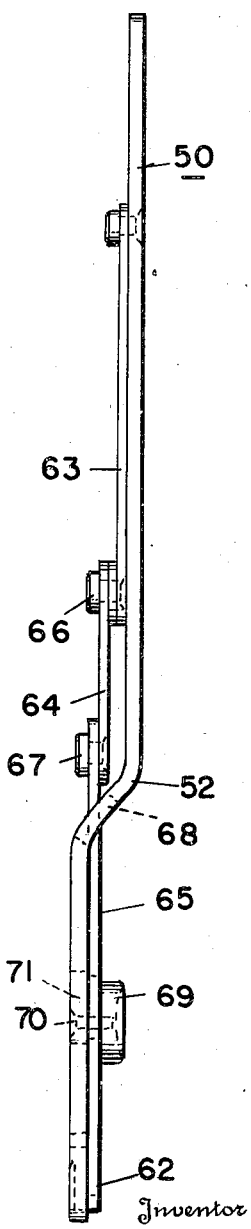
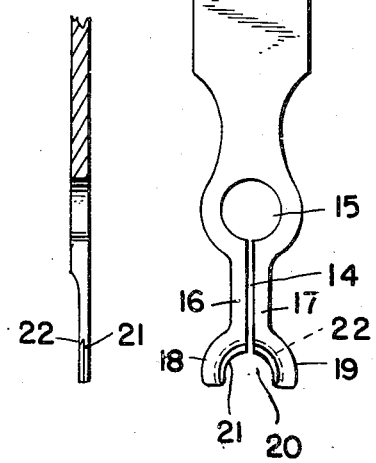
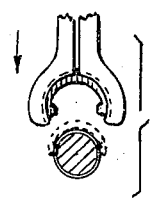
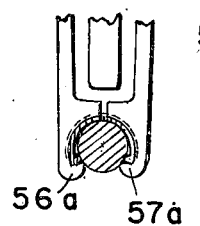
Inventor
JULES BRELL, Sept. 27, 1949.　　　　J. BRELL　　　　2,483,379
MEANS FOR HANDLING RETAINING RINGS
Filed Aug. 19, 1946　　　　　　　　　　3 Sheets-Sheet 2
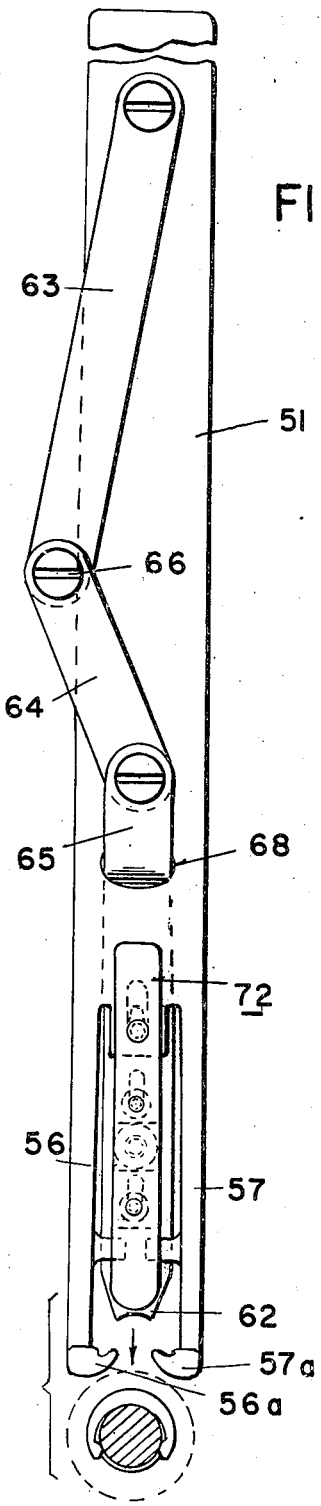
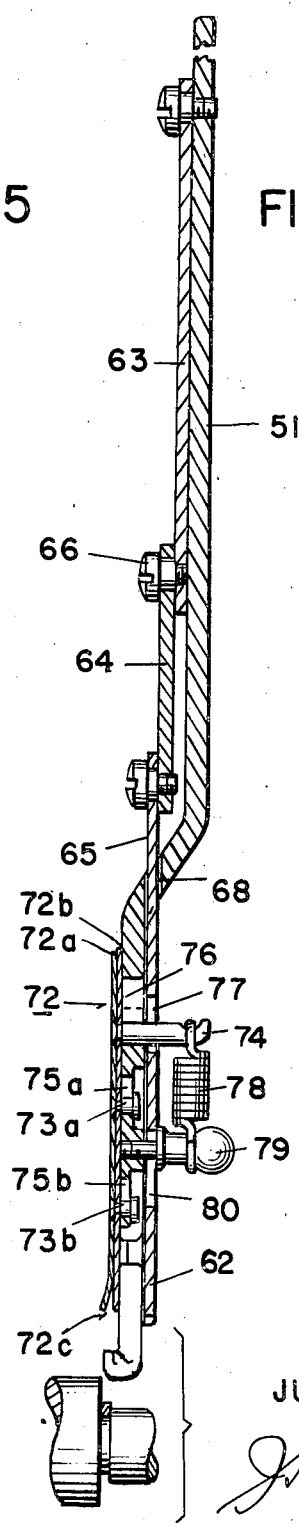
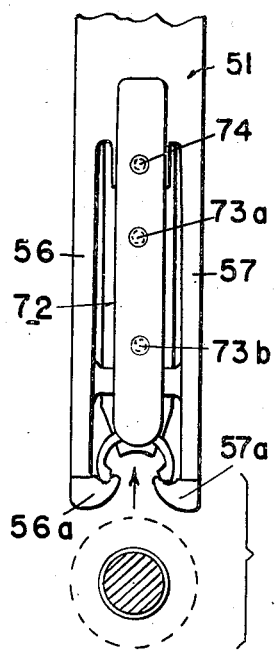
Inventor
JULES BRELL,
Attorney Sept. 27, 1949.　　　　　J. BRELL　　　　　2,483,379
MEANS FOR HANDLING RETAINING RINGS
Filed Aug. 19, 1946　　　　　　　　　　　　3 Sheets-Sheet 3
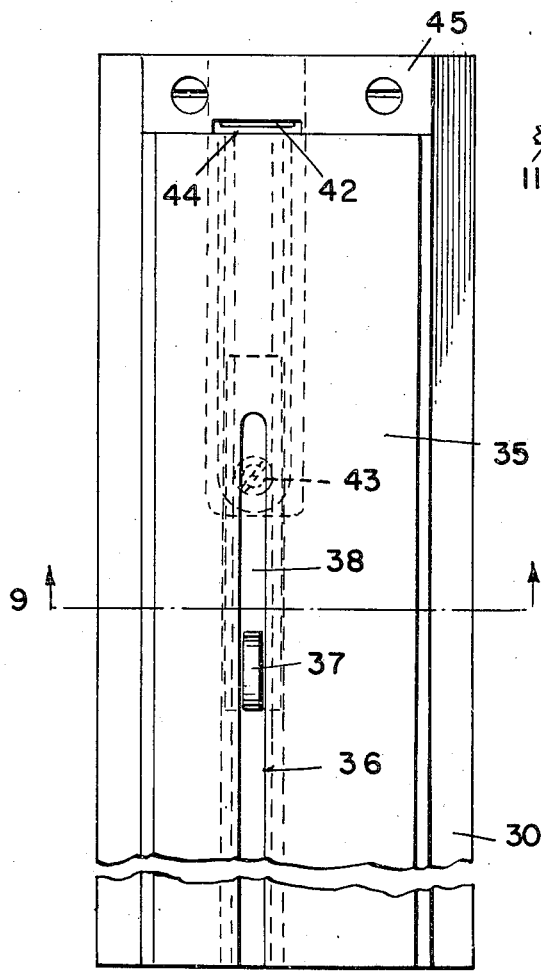
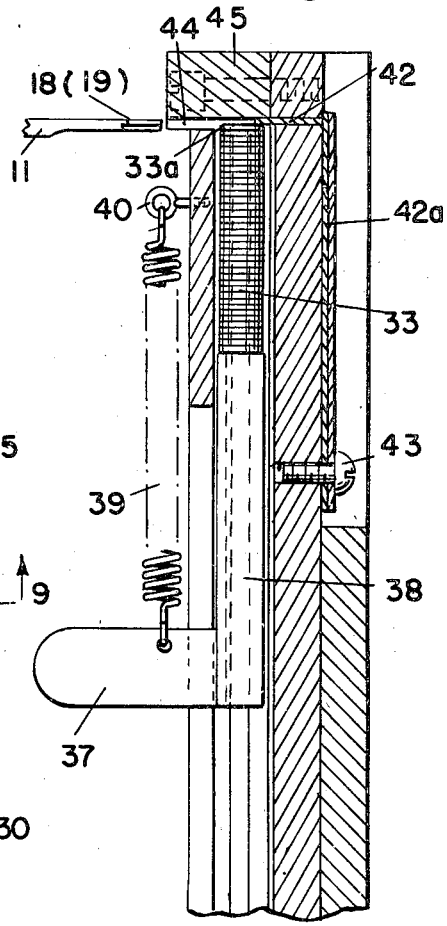
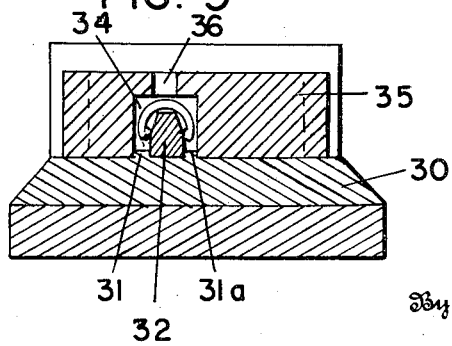
Inventor
JULES BRELL,
By
Attorney Patented Sept. 27, 1949

2,483,379

UNITED STATES PATENT OFFICE 2,483,379

MEANS FOR HANDLING RETAINING RINGS

Jules Brell, Baldwin, N. Y., assignor to Waldes Koh-I-Noor, Inc., Long Island City, N. Y., a corporation of New York Application August 19, 1946, Serial No. 691,660

2 Claims. (Cl. 29—229)

This invention relates to improvements in means for handling retaining rings and has particular reference to tools for inserting retaining rings of the so-called open type in and for withdrawing such rings from their seating grooves, as well as to a magazine-type holder for such rings, which facilitates stocking thereof in quantity, and from which the rings can be withdrawn as needed by a tool as aforesaid.

As is well known, retaining rings usually take the form of an open-ended ring or annulus which is sprung into a groove provided therefor in a shaft, pin and the like to serve as an artificial shaft or pin shoulder which secures a machine part against axial displacement relative thereto. As distinguished from the nearly-closed retaining rings, open retaining rings take the form of a ring segment having a relatively large-width gap between the open ends thereof, and in assembly such a ring segment is spread directly across a shaft in the plane of its seating groove, being designed so that it can be spread an amount such that its free ends are spaced by a distance equal to the diameter of the bottom of the seating groove.

Difficulties have been encountered in assembly and disassembly of open retaining rings, because they are usually devoid of the apertured ears as are provided at the free ends of the substantially closed rings to facilitate their handling, and also because considerable force must be exerted on the open rings in forcing them into and withdrawing them from their seating groove. A further difficulty in the assembly of the open rings follows from the requirement that, to insert such rings, they must be held exactly in the plane of their groove; otherwise they do not properly seat themselves.

The present invention seeks to overcome the above-mentioned difficulties through the provision of a simple yet effective tool by which the ring can be readily gripped and held exactly in the plane of the groove and through which the force necessary to seat and/or withdraw the ring may be effectively exerted. Yet another object of the invention is to provide a simple and thoroughly dependable magazine-type holder which facilitates stocking of a quantity of open retaining rings, and into which a tool as aforesaid may be inserted to grasp a ring for withdrawal from the holder as needed.

A tool according to the invention, by which the above and other desirable objectives are achieved, in general comprises two resiliently interconnected arcuate jaws which together provide a substantially semi-circular seating recess for the ring being handled and which are adapted to grip the ring throughout its full arcuate length and hold it securely by the spring action of the arcuate jaws. With the ring so held, the tool may be employed to position the ring across the shaft and exactly in the plane of its seating groove, and thereupon to impart the force necessary to spread it over the shaft to effect its seating. Such a tool is moreover so designed that it may be lifted away from the ring upon seating thereof, the tool design providing that the force required to spread the ring in order to effect its withdrawal shall be considerably greater than the gripping action capable of being exerted by the jaws on the ring.

For withdrawing a ring from its groove, the invention provides a tool of basically the same general construction comprising two resiliently interconnected arcuate jaws which together form a seating recess for the ring to be withdrawn and which are spreadable with the ring during the withdrawal operation. In the case of the withdrawing tool, the spring action of the jaws in gripping the ring is greater than the spreading force required to remove the ring from the groove, or, alternatively, the jaws may be provided at their free ends with inwardly directed hooks which grip under the lugs at the ends of the ring, if such are provided, or under the end edges of the ring, and thereby serve to prevent the ring from pulling out of its jaw seat as the tool is lifted away from the shaft to in turn pull the ring out of its groove. It is a further feature of the invention that the aforesaid tool lifting action may be augmented by a presser member or foot associated with the tool, and which is actuated by a simple toggle mechanism, the presser foot reacting against the shaft to exert a raising or lifting force on the tool proper.

To stock a plurality of the rings for ready assembly, the invention also contemplates a magazine-type holder for a plurality of the rings arranged in longitudinal row formation and in face engagement, the holder incorporating a spring-urged slide to move the endmost ring into a tool-receiving slot, into which a ring inserting tool as aforesaid may be slipped in position such that it is enabled to securely grasp the ring and withdraw it from the holder.

The above and other objects and features of advantage of the invention will be more readily understood from the following detailed description accompanied by drawings, in which—

Fig. 1 is a plan view of a tool according to the invention for inserting external retaining rings of the open type in a shaft groove;

Fig. 2 is a longitudinal section taken through the working end of the tool shown in Fig. 1;

Fig. 2A is a broken-away detail view showing the gripping action of the tool jaws on an open retaining ring, and further illustrating the action of the tool in inserting the ring in a seating groove provided in a shaft, pin and the like;

Fig. 3 is a plan view of a tool according to the invention for withdrawing open-type retaining rings from a shaft groove;

Fig. 4 is a side view of the tool illustrated in Fig. 4;

Fig. 4A is a broken-away detail view of the working end of the tool shown in Figs. 4 and 5, the view further illustrating the gripping action of the tool on a seated ring;

Figs. 5, 6 and 6A are views similar to Figs. 3, 4 and 4A illustrating another embodiment of ring withdrawing tool according to the invention;

Fig. 7 is a broken-away plan view of a magazine-type holder for stocking a plurality of open retaining rings for assembly as required;

Fig. 8 is a longitudinal section taken through the holder shown in Fig. 7, and further illustrating the manner of removal of the stocked rings; and Fig. 9 is a transverse section taken through the holder along line 9—9 of Fig. 7.

Referring to the drawings, and particularly to Figs. 1–2A, reference character 10 denotes a ring inserting tool according to the invention comprising an elongated blade or shank member 11 provided at one end with a handle 12 secured as by screws 13. The lower end of the shank is formed resilient by a longitudinal slot 14 extending downwardly from circular opening 15 in the shank proper. The slot 14 defines two elongated prongs 16, 17 whose lower ends are formed as segments of a circle to provide thin, coplanar arcuate jaws 18, 19 which together form a substantially semi-circular recess 20, corresponding in shape to that of the segmental or open retaining rings being handled. It will be understood that the radius of the recess 20 is somewhat less than that of the rings whereby a ring seating in the recess effects slight spreading of the jaws 18, 19. Accordingly, the jaws are adapted to exert a resilient gripping action on the ring disposed in the tool recess, as well as to grip the same throughout its full arcuate length.

Preferably, the inner arcuate edges of the jaws 18, 19 are undercut in manner as to provide a ring backing flange 21 which projects radially into the recess 20, and a ring-edge seating groove 22 (Fig. 2) defined by the ring-backing face of the flange and the inner arcuate edges of the jaws, which edges are preferably inclined at an angle of less than 90° to the flange backing face. Accordingly, the ring-backing flange 21 and the ring-edge seating groove 22 together provide a ring seat which precludes shifting of a ring out of its plane upon being gripped by and between the jaws 18, 19.

By proper design of the working end of the tool, the arcuate jaws 18, 19 thereof exert a gripping force on a ring seated in the recess 20 thereof which is adequate to firmly grasp and secure the ring in normal handling, i. e. in withdrawing a ring from the holder to be described, in moving the ring in position across a shaft and in the plane of its seating groove, and in forcing the ring into its groove. However, this gripping force is less than the force required to withdraw a seated ring from its shaft groove, and accordingly the tool following the inserting operation may be readily pulled away from the ring, with assurance that the ring remains seated in its shaft groove.

Preferably, a ring inserting tool as described is used in conjunction with the magazine-type ring holder illustrated in Figs. 7, 8 and 9. Such a holder may comprise a horizontal base 30 having longitudinal ribs 31, 31a extending from its upper face. Between said ribs is mounted a guide bar 32 on which is arranged a longitudinal row of rings 33 disposed in face engagement. The row of rings is enclosed within a downwardly opening longitudinal channel or recess 34 provided in a cover 35 affixed to the base, the cover being provided with a slot 36 in its top plate through which an arm or handle 37 is adapted to project, as shown in Fig. 8.

The rings are pushed forwardly in the direction of a holder front plate 45 by means of a slide 38 operating in the cover plate recess 34, and to which the handle 37 may be integrally connected as shown. A coil spring 39 operative between the handle 37 and an eye 40 affixed to the cover 35 tends to urge the slide 38, and hence the rings 33 forwardly, so that the endmost ring 33a engages against an upright spacer finger 42 which projects through an opening in the base 30 and into an upwardly opening channel or slot 44 (Fig. 7) provided in the rear face of the holder frontplate 45. As best seen in Fig. 8, the spacer finger 42 is carried by a resilient attaching leg 42a which is secured as by a screw 43 to the under face of the base 30.

The slot 44 provides an opening for the insertion of the working end of the ring applying tool, as described. Upon insertion of the tool, the jaws 18, 19 thereof grasp the endmost ring 33a positioned by the spacer 42. Due to the resilience of the spacer attaching leg 42a, insertion of the tool effects depression of the spacer finger by an amount permitting the jaws to grip the ring throughout its full circumferential edge, and accordingly withdrawal of the tool effects withdrawal of the endmost ring from the holder, whereupon the tool may be employed to position the ring relative to shaft and to force it into its seating groove.

Referring to Figs. 3, 4 and 4A which illustrate a tool 50 according to the invention that is designed more particularly for effecting withdrawal or disassembly of an open retaining ring from its shaft groove, the tool comprises an elongated metal blade or shank 51 having a knee-like band 52 formed therein whereby its lower or working end is disposed in a plane forward of the upper or handle end. At its lower end, the shank is formed resilient by means of a U-shaped slot 53 cut therein generally as shown, the slotting providing two prongs 54, 55 terminating in segmental jaws 56, 57 which are spaced by a slot 58. The jaws 56, 57 together provide a part-circular recess 59 corresponding to the recess 20 of the prior described tool, and the arcuate inner edges of the jaws are moreover undercut as at 60, 61 to provide an arcuate seat or recess for the ring which is to be withdrawn from its seating groove. The jaws terminate as shown in inwardly directed hooks 56a, 57a which are adapted to engage beneath the lugs at the ends of the retaining ring, if such are provided, or directly beneath the end edges of the ring.

By the above-described resilient jaw arrangement, it will be observed from Fig. 4A that when it is desired to disassemble a ring from its groove, the tool shank is pressed downwardly over the ring, the jaws 56, 57 meanwhile spreading over the ring until the hooks 56a, 57a snap beneath the lugs or free ends of the ring. The ring is now gripped along its outer circumferential edge and also below its free ends. Upon pulling force being applied to the tool, the ring is lifted from its groove, the resilient interconnection of the jaws permitting them to spread with the ring as the latter clears the shaft, the hooks 56a, 57a meantime assuring firm tool-grip on the ring.

To facilitate the ring lifting operation, and at the same time to insure that the lifting force is applied directly in the plane of the seated ring, the invention also contemplates the provision of a toggle-actuated presser foot 62 which is reactive against the shaft to forcibly lift the jaw end of the tool and the ring embraced thereby from the shaft. As best seen in Figs. 3 and 4, the toggle mechanism comprises a system of links 63, 64, 65, of which the presser foot 62 is formed at the bottom of the link 65. The link 63 at its upper end is pivotally secured to the upper end of the blade or shank 51, and at its lower end is pivotally connected by pin 66 to the link 64, the latter link being pivotally connected at its lower end to link 65 by pin 67.

The link 65 projects through a hole 68 formed in the knee 52 of the tool shank and while permitted limited reciprocating movement relative thereto is restrained against movement out of its plane by a head 69 affixed to the tool shank 51 by means of a pin 70 which extends through a slot 71 formed in the link 65 intermediate its ends.

By the above described mechanism, straightening-out of the toggle levers 63, 64, as by pressure exerted on the joint 66 therebetween, results in link 65 being actuated downwardly relative to the tool shank. The presser foot 62 is thereby forcibly engaged against the periphery of the shaft adjacent the ring groove and accordingly a reactive force is applied to the tool proper and ring gripped thereby, to effect withdrawal or disassembly of the ring from its groove.

Referring to Figs. 5, 6 and 6A, illustrating another form of ring withdrawing tool according to the invention and which is characterized by its ability to securely hold the ring within the tool recess after it has been extracted from its shaft groove, the modified tool comprises an elongated blade or shank 51 whose lower end is formed as spaced resilient jaws 56, 57 terminating in inwardly directed hooks 56a, 57a, as previously described. The shank carries a toggle-actuated presser foot 62 reactive against the shaft to forcibly lift the jaw end of the blade upon straightening-out of the toggle linkage, which latter comprises the pivotally connected links 63, 64, 65 corresponding to the like numbered parts of the prior described modification, of which the link 65 operates through slot 68 formed in the bend or knee 52 of the shank, all as previously described.

The modified tool incorporates a sliding ring clip 72 consisting of two thin plates 72a, 72b which are secured in face engagement throughout the intermediate and upper portions of their lengths by headed studs 73a, 73b and by an axially elongated pin 74 as shown. As best seen in Fig. 6, the lower free ends of the plates extend into the ring recess provided by the spaced jaws 56, 57, and are slightly spread as shown to form a ring gap 72c which serves to receive the middle portion of a ring contained in said recess as will be described. The clip 72 is guided in its sliding movement with respect to the tool shank through the provision of vertical slots 75a, 75b formed in the shank in which the studs 73a, 73b operate, and of an upper vertical slot 76 through which the pin 74 extends, the pin also extending rearwardly through an aligned slot 77 provided in the link 65. Clip 72 slides upwardly relative to the shank 51 against the action of a spring 78, one end of which is connected to a pin 79 operating through a slot 80 formed in the link 65 and affixed to the shank, the other end of the spring being anchored to the extending hooked end of the pin 74.

When the tool is pushed downwardly over a ring to be withdrawn from its shaft groove, link 65 moves upwardly and, as the lower end of the link slot 77 abuts against the pin 74, the clip 72 slides upwardly with the link relative to shank 51 and the spring 78 is thereby elongated. Upon the hooks engaging under the free ends of the ring (Fig. 6A), the toggle linkage is straightened as by force applied to link pin 66 as heretofore, with the result that presser foot 62 is forced against the shaft to effect raising of the hooks 56a, 57a and withdrawal of the ring. At the same time, clip 72 returns with a fast or snap movement to its initial position under the action of spring 78 which is now free to contract, with the result that the middle portion of the ring gripped by the hooks 56a, 57a is forced into the gap 72c of the clip and securely held therein against accidental dropping out from the tool recess following the withdrawal operation. It will be observed also that the clip secures the withdrawn ring in any handling position of the tool, and thus it is virtually impossible for the ring to drop into the machine and/or for the ring to become lost.

While the illustrated ring withdrawing tools incorporate hook-like projections 56a, 57a adapted to positively undergrip the ring lugs or ends of the ring, the invention also contemplates a withdrawing tool devoid of such hooks and in which the necessary tool-grip on the ring is obtained through a design of tool which provides that the spring gripping force exerted directly by the jaws is greater than the force necessary to spread the ring in its withdrawal from the shaft groove. It will be observed that such construction of ring withdrawing tool follows generally the construction of a ring applying tool as illustrated in Figs. 1–2A, and differs therefrom only in that the resilient jaws thereof are made strong enough to hold the ring against the spreading force required to lift it from its groove.

Without further analysis, it will be seen that the invention provides simple yet effective tools for inserting open retaining rings in their seating grooves, as provided in shafts, pins or the like, and in removing or disassembling such rings from their grooves for repair, replacement or the like. According to the invention, there is moreover provided a simple and effective magazine-type holder for a plurality of rings, which facilitates stocking of the rings for withdrawal as required, and in conjunction with which the ring inserting tool is employed to effect withdrawal of the stocked rings singly for insertion into a shaft groove, as and when desired.

As many changes could be made in carrying out the above construction without departing from the scope of the invention, it is intended that all matter contained in the above description or shown in the accompanying drawings shall be

I claim:

1. A tool for inserting "open" retaining rings in their shaft grooves comprising a pair of thin, coplanar arcuate jaws which together form a part-circular recess of arcuate length corresponding substantially to that of the ring and having a normal diameter which is slightly less than the outer diameter of the ring, and means resiliently interconnecting said jaws, the arcuate inner edges of the jaws being undercut to provide a ring backing flange and a ring-edge seating groove, the resilient interconnection of said jaws providing a resilient clamping of ring in seating groove during handling, while permitting the jaws to spring apart in the operations of pushing the tool edgewise on to a ring, of forcibly inserting the ring in its shaft groove and of withdrawing the tool edgewise from the ring following its insertion in a shaft groove, and the backing flange and ring-edge seating groove cooperating one with the other in maintaining the ring in its plane during handling and when it is being forcibly inserted in its groove.

2. A tool for inserting "open" retaining rings in their shaft grooves comprising a pair of thin, coplanar arcuate jaws which together form a part-circular recess of arcuate length corresponding substantially to that of the ring and having a normal diameter which is slightly less than the outer diameter of the ring, and means resiliently interconnecting said jaws, the arcuate inner edges of the jaws being undercut to provide an arcuate ring backing flange extending radially into the part-circular recess and a ring-edge seating groove defined by the ring backing face of said flange and said arcuate inner edges, which latter are angularly inclined to said ring backing face of the flange, the resilient interconnection of said jaws providing a resilient clamping of ring in seating groove during handling, while permitting the jaws to spring apart in the operations of pushing the tool edgewise on to a ring, of forcibly inserting the ring into its shaft groove and of withdrawing the tool edgewise from the ring following its insertion in the shaft groove, and the backing flange and ring-edge seating groove cooperating one with the other in maintaining the ring in its plane during handling and when it is being forcibly inserted into its groove.

JULES BRELL.

REFERENCES CITED

The following references are of record in the file of this patent:

UNITED STATES PATENTS

| Number | Name | Date |
| --- | --- | --- |
| 468,000 | Tomek | Feb. 2, 1892 |
| 932,983 | Grubb | Aug. 31, 1909 |
| 1,368,446 | Madsen | Feb. 15, 1921 |
| 1,456,007 | Hartson et al. | May 22, 1923 |
| 1,623,786 | Girard | Apr. 5, 1927 |
| 1,779,306 | Clark | Oct. 21, 1930 |
| 1,807,509 | Clark | May 26, 1931 |
| 1,824,616 | Neher | Sept. 22, 1931 |
| 1,837,644 | Baash et al. | Dec. 22, 1931 |
| 1,851,126 | Nikkelsen | Mar. 29, 1932 |
| 1,861,973 | Mindermann et al. | June 7, 1932 |
| 1,874,257 | Doptis | Aug. 30, 1932 |
| 2,002,016 | Kyser | May 21, 1935 |